(12) United States Patent
Moulon et al.

(10) Patent No.: US 11,035,445 B2
(45) Date of Patent: Jun. 15, 2021

(54) HORIZONTAL STABILISER ACTUATOR WITH FREEPLAY DETECTING FEATURES AND METHOD THEREOF

(71) Applicant: Goodrich Actuation Systems SAS, Buc (FR)

(72) Inventors: Thomas Moulon, Ermont (FR); Raphaël Medina, Ecouen (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 556 days.

(21) Appl. No.: 15/532,184

(22) PCT Filed: Dec. 1, 2014

(86) PCT No.: PCT/IB2014/002919
§ 371 (c)(1),
(2) Date: Jun. 1, 2017

(87) PCT Pub. No.: WO2016/087891
PCT Pub. Date: Jun. 9, 2016

(65) Prior Publication Data
US 2017/0335931 A1 Nov. 23, 2017

(51) Int. Cl.
*F16H 25/00* (2006.01)
*F16H 25/20* (2006.01)
(Continued)

(52) U.S. Cl.
CPC ............ *F16H 25/2015* (2013.01); *B64C 5/02* (2013.01); *B64C 5/10* (2013.01); *B64C 5/16* (2013.01); *B64C 13/341* (2018.01); *F16H 25/24* (2013.01)

(58) Field of Classification Search
CPC .. F16H 25/2454; F16H 25/2015; F16H 25/24; F16H 25/00; B64C 5/02;
(Continued)

(56) References Cited

U.S. PATENT DOCUMENTS 3,468,563 A * 9/1969 Duret ................... F16L 15/001
285/93
3,802,281 A * 4/1974 Clarke ................ F16H 25/2021
74/89.39

(Continued)

FOREIGN PATENT DOCUMENTS

EP 2302262 A2 3/2011

OTHER PUBLICATIONS

PCT International Search Report and Written Opinion of the International Searching Authority, or the Declaration for International Application No. PCT/IB2014/002919, dated Aug. 5, 2015, 11 pages.

*Primary Examiner* — Victor L Macarthur
(74) *Attorney, Agent, or Firm* — Cantor Colburn LLP (57) ABSTRACT

A screw (20) assembly for an actuator (10) is described comprising: a screw (20); a nut (22) threaded on said screw (20), such that rotation of said screw (20) causes axial movement of said nut (22); a stop located at an end of said screw (20) and defining an axial limit of said nut (22); a first feature located on said nut (22); and a second feature located on said stop; wherein said first and second features are configured to cooperate with one another substantially upon contact of said nut (22) with said stop so as to indicate an amount of free movement between said nut (22) and said screw (20).

14 Claims, 5 Drawing Sheets

(51) Int. Cl.
*B64C 13/28* (2006.01)
*B64C 5/16* (2006.01)
*B64C 5/02* (2006.01)
*B64C 5/10* (2006.01)
*F16H 25/24* (2006.01)

(58) Field of Classification Search
CPC ........... B64C 5/16; B64C 13/341; B64C 5/10; B64C 13/28; G01M 13/02
See application file for complete search history.

(56) References Cited

U.S. PATENT DOCUMENTS

| | | | | |
|---|---|---|---|---|
| 4,459,867 A * | 7/1984 | Jones | ................. | F16H 25/2021 192/150 |
| 4,643,290 A * | 2/1987 | Metcalf | ................. | F16D 41/206 192/141 |
| 4,679,485 A * | 7/1987 | Nelson | ................. | F16H 25/205 89/36.02 |
| 5,467,661 A * | 11/1995 | Lange | ................. | F16H 25/2204 74/424.82 |
| 6,672,540 B1 * | 1/2004 | Shaheen | ............. | F16H 25/2204 244/99.3 |
| 7,100,465 B1 * | 9/2006 | Hollis | ................. | F16H 25/2204 74/411.5 |
| 8,033,500 B1 * | 10/2011 | Charafeddine | ......... | B64C 13/28 244/75.1 |
| 8,113,076 B2 * | 2/2012 | Daul | ....................... | B60N 2/233 74/89.39 |
| 8,118,254 B2 * | 2/2012 | Cavalier | .............. | F16H 25/2454 244/99.2 |
| 8,191,824 B2 * | 6/2012 | Shaheen | ................. | B64C 13/24 244/75.1 |
| 8,281,678 B2 * | 10/2012 | Cavalier | ................. | F16H 25/22 74/412 TA |
| 8,393,568 B2 * | 3/2013 | Maresko | ................. | F16D 7/007 244/99.2 |
| 8,496,204 B1 | 7/2013 | Charafeddine et al. | | |
| 8,596,154 B2 * | 12/2013 | Cavalier | ................. | F16H 25/22 116/200 |
| 8,702,034 B2 * | 4/2014 | Moulon | .................... | B64C 9/02 244/99.2 |
| 10,065,728 B2 * | 9/2018 | Cyrot | .................... | B64C 13/343 |
| 2007/0203656 A1 | 8/2007 | Sheahan et al. | | |
| 2010/0031761 A1 * | 2/2010 | Daul | ....................... | B60N 2/233 74/89.24 |
| 2010/0264263 A1 * | 10/2010 | Shaheen | ................. | B64C 13/24 244/99.3 |
| 2013/0001357 A1 * | 1/2013 | Cyrot | .................... | B64C 13/505 244/99.4 |

* cited by examiner

HORIZONTAL STABILISER ACTUATOR WITH FREEPLAY DETECTING FEATURES AND METHOD THEREOF

CROSS REFERENCE TO RELATED APPLICATIONS

This is a US National Stage of Application No. PCT/IB 2014/002919, filed on Dec. 1, 2014, the disclosure of which is incorporated herein by reference.

BACKGROUND

A horizontal stabiliser is an aircraft component that stabilises the airframe during flight. Typically, they are found at the rear of the fuselage, and incorporate a moveable surface for adjustment in response to trim signals from the pilot. The moveable surfaces are controlled by an actuator, known as a trimmable horizontal stabiliser actuator ("THSA"). This is controlled by a hydraulic and/or electric motor that is connected to the aircraft fuselage.

The THSA comprises a number of moving components, including a rotating screw, rotation of which is caused by the hydraulic and/or electric motors. This rotating screw causes axial movement of a nut, which in turn drives the moveable surface of the horizontal stabiliser.

The nut of the THSA moves between two opposite end stops and contacts these stops when the actuator moves to its opposite extremities. The nut will wear during use and this can be a serious issue if the wear is serious enough. Detection of the failure of the nut due to wear is essential for safety and can be critical.

Furthermore, an overstroke check may be made when the actuator is installed on an aircraft. The overstroke check involves recording when the nut of the actuator reaches its opposite extremities, and noting this for tolerance and precision checks.

It is desired to provide improved methods for detecting the wear of a screw assembly used in an actuator of a trimmable horizontal stabiliser actuator.

SUMMARY

In accordance with an aspect of the disclosure, there is provided a screw assembly for an actuator, comprising:
a screw, for example a ballscrew;
a nut threaded on the screw, such that rotation of the screw causes axial movement of the nut;
a stop located at an end of the screw and defining an axial limit of the nut;
a first feature located on the nut; and
a second feature located on the stop;
wherein the first and second features are configured to cooperate with one another substantially upon contact of the nut with the stop so as to indicate an amount of free movement between the nut and the screw.

This ensures that the free movement, which is otherwise known as backlash or clearance, can be easily determined or checked upon an inspection of the cooperation of the first and second features upon contact of the nut with the stop, or when the nut is close to contacting the stop.

As used herein, "substantially upon contact" may be interpreted as close to contact or near to contact, such that the cooperation of the first and second features can be determined, for example visually. Optionally, the first and second features may be configured to cooperate with one another upon contact of the nut with the stop so as to indicate an amount of free movement between the nut and the screw.

The actuator may be for use in an aircraft, and may be an actuator for driving a horizontal stabiliser of an aircraft.

The first feature may comprise a first visual or tactile feature, for example a first mark, and the second feature may comprise a second visual or tactile feature, for example a second mark. The first or second tactile features may comprise a notch or protrusion.

The first and second features may be positioned or configured such that their relative positions substantially upon contact of the nut with the stop provide a measure of free movement between the nut and the screw.

A limit of acceptable free movement between the nut and the screw may be determined. The first and second features may be configured such that, upon contact of the nut with the stop, the first and second features substantially align with one another if the free movement between the nut and the screw is within the limit, and optionally do not substantially align with one another if the free movement between the nut and the screw is outside of the limit.

A rotational position of the first and/or second feature upon contact of the nut with the stop may be adjustable, for example by adjusting the rotational position of the stop with respect to the nut.

One of the nut and stop may comprise a first lug configured to contact a lug on the other of the nut and stop to define an initial axial limit of the nut.

The one of the nut and stop may comprise a second lug configured to contact the lug on the other of the nut and stop before the first lug upon a predetermined increase in free movement between the nut and the screw.

The contact between the second lug and the lug on the other of the nut and stop may define a subsequent, different axial limit of the nut. The subsequent axial limit may be lower or shorter, or closer to the centre of the screw than the initial axial limit.

The first and second lugs may be located at the same radial position, but different circumferential positions on the one of the nut and stop.

The first and second lugs may be located at different circumferential positions on the one of the nut and stop, and the rotational position of the nut and/or the stop may be configured such that a predetermined clearance is provided between the second lug and the lug on the other of the nut and stop in the final turn of the screw.

The predetermined clearance may correspond to a predetermined limit of acceptable free movement between the nut and the screw, such that the first lug may contact the lug on the other of the nut and stop if the free movement between the nut and the screw is within the limit, and the second lug may contact the lug on the other of the nut and stop if the free movement between the nut and the screw is outside of the limit.

The predetermined clearance, limit or increase in free movement between the nut and the screw may be due to a predetermined or predicted wear of the nut and/or screw during use. The predetermined clearance may be calculated from a predetermined or predicted wear of said nut and/or screw during use.

The nut may comprises the first and second lugs, and the first and/or second lugs may constitute or comprise the first feature, and the lug on the stop may constitute or comprise the second feature; or the stop may comprise the first and second lugs, and the first and/or second lugs may constitute or comprise the second feature, and the lug on the stop may constitute or comprise the first feature.

The first feature and the second feature may cooperate such that, upon contact of said nut with said stop, said first and second features present a visual or tactile confirmation or measure of free movement between the nut and the screw.

In accordance with an aspect of the disclosure, there is provided an actuator for an aircraft comprising a screw assembly as claimed in any preceding claim.

In accordance with an aspect of the disclosure, there is provided a method comprising:
providing a screw assembly for an actuator, said screw assembly comprising:
a screw;
a nut threaded on said screw, such that rotation of said screw causes axial movement of said nut; and
a stop located at an end of said screw and defining an axial limit of said nut;
wherein said stop or said nut comprises a first lug and a second lug;
marking said nut and/or said stop so as to indicate an amount of free movement between said nut and said screw upon contact between said nut and said stop.

In accordance with an aspect of the disclosure, there is provided a method comprising:
providing a screw assembly for an actuator, the screw assembly comprising:
a screw;
a nut threaded on the screw, such that rotation of the screw causes axial movement of the nut; and
a stop located at an end of the screw and defining an axial limit of the nut;
wherein the stop or the nut comprises a first lug and a second lug;
locating and/or positioning the first lug and the second lug such that the nut or stop contacts the first lug upon rotation of the screw to define an initial axial limit of the nut, but does not contact the second lug upon rotation of the screw;
determining an acceptable amount of free movement between the nut and the screw in an axial direction;
locating and/or positioning the second lug such that the second lug contacts the nut or stop before the first lug to define a subsequent axial limit of the nut once the free movement between the nut and the screw reaches or exceeds the acceptable amount.

In accordance with an aspect of the disclosure, there is provided a screw assembly for an actuator, comprising:
a screw;
a nut threaded on the screw such that rotation of the screw causes axial movement of the nut; and
a stop located at an end of the screw and defining an axial limit of the nut;
wherein one of the nut and stop comprises a first lug configured to contact a lug on the other of the nut and stop to define an initial axial limit of the nut, and the one of the nut and stop comprises a second lug configured to contact the lug on the other of the nut and stop before the first lug upon a predetermined increase in free movement between the nut and the screw.

The first lug may comprise a first visual or tactile feature, for example a first mark, and the second lug may comprise a second visual or tactile feature, for example a second mark. The first or second tactile features may comprise a notch or protrusion. The lug on the other of the nut and stop may comprise a visual or tactile feature that is the same as, or different to the first visual or tactile feature and/or the second visual or tactile feature. The first visual or tactile feature may be different to the second visual or tactile feature. The second visual or tactile feature may comprise a warning sign.

In accordance with an aspect of the disclosure, there is provided a screw assembly for an actuator, the screw assembly comprising a screw, a nut threaded on the screw such that rotation of the screw causes axial movement of the nut, and a plurality of stops located at or near an end of the screw, each comprising a different axial limit of the nut;
wherein optionally the plurality of stops are located or configured such that the nut will contact different ones of the stops based on the amount of free movement that exists between the nut and the screw.

The plurality of stops may be located circumferentially about an end of the nut, or on an object located near the axial limit of the nut, and optionally at the same radial position. The plurality of stops may be located such that the nut will contact different ones of the stops as the free movement between the nut and the screw increases over time. The plurality of stops may be differentiable from one another, for example the plurality of stops may comprise different visual or tactile features.

The features of any of the above aspects of the disclosure may be combined with the features of any of the other aspects of the disclosure described above.

BRIEF DESCRIPTION OF THE DRAWINGS

Various embodiments will now be described, by way of example only, and with reference to the accompanying drawings in which.

DETAILED DESCRIPTION

Figure 1:
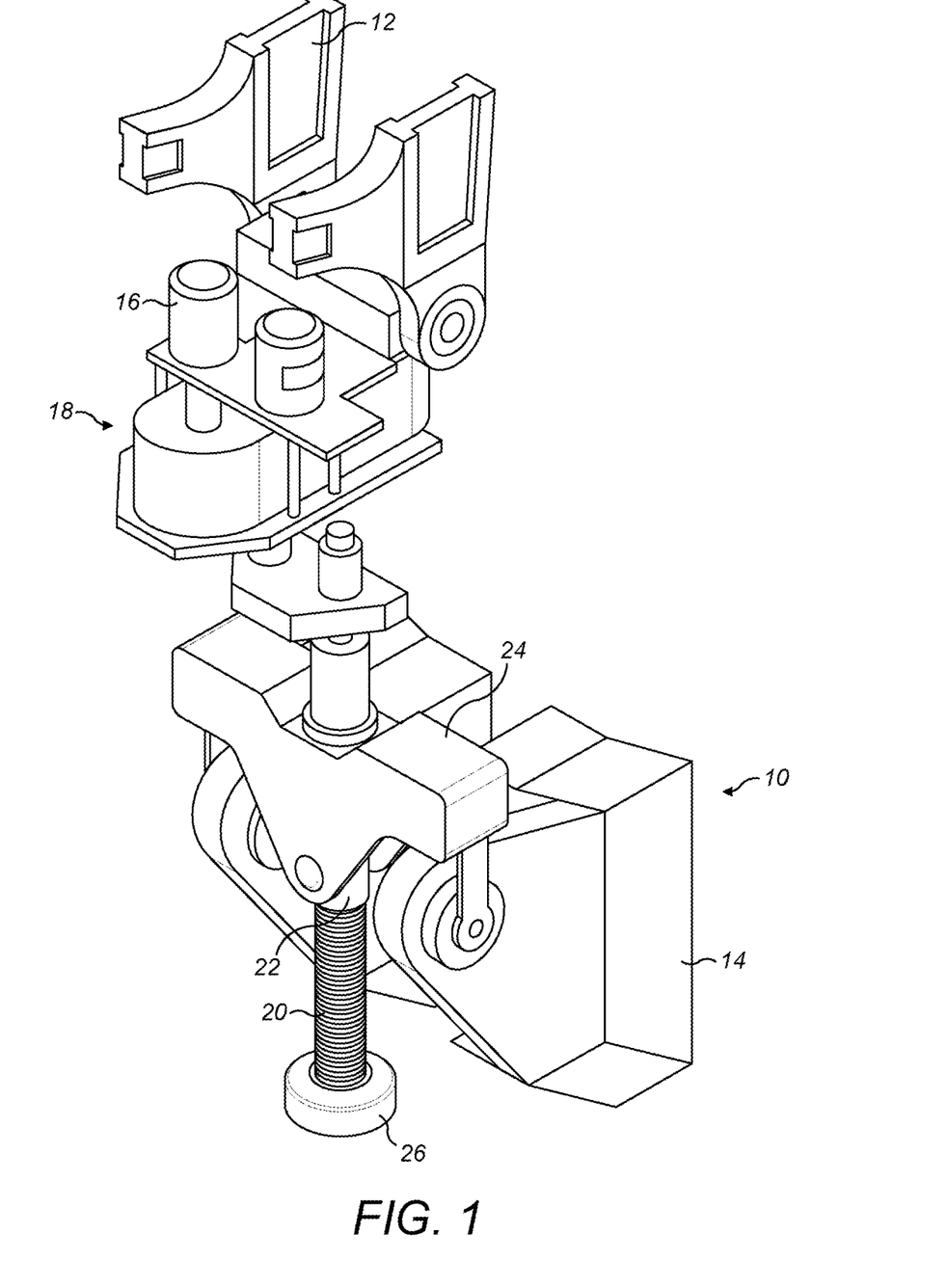
FIG. 1 shows a horizontal stabiliser actuator.

FIG. 1 shows a horizontal stabiliser actuator 10.

The actuator 10 is connected to a fuselage structure 12 of an aircraft (not shown). A moveable component 14 is driven by the actuator 10. Specifically, the actuator 10 comprises a mechanical screw assembly comprising a screw 20, as well as a nut 22 threaded to the screw 20 and coupled to the moveable component 14. The screw 20 may be fixed in its longitudinal, or axial direction, such that rotation of said screw 20 causes the nut 22 to move up and down its length in the longitudinal, or axial direction. This in turn drives the moveable component 14 as required.

The screw 20 may be a ballscrew such that movement of said nut 22 is caused due to the presence of balls (not shown) between the nut 22 and the shaft of the screw 20.

The screw 20 is rotated by means of one or more motors 16 that drive a gear assembly 18, which gears cause said screw 20 to rotate. Upon rotation of the screw 20, the nut 22 moves between an upper stop 24 and a lower stop 26. The upper stop 24 and the lower stop 26 define the limits of the nut 22 and are rotatable with the screw 20.

Figure 2A:
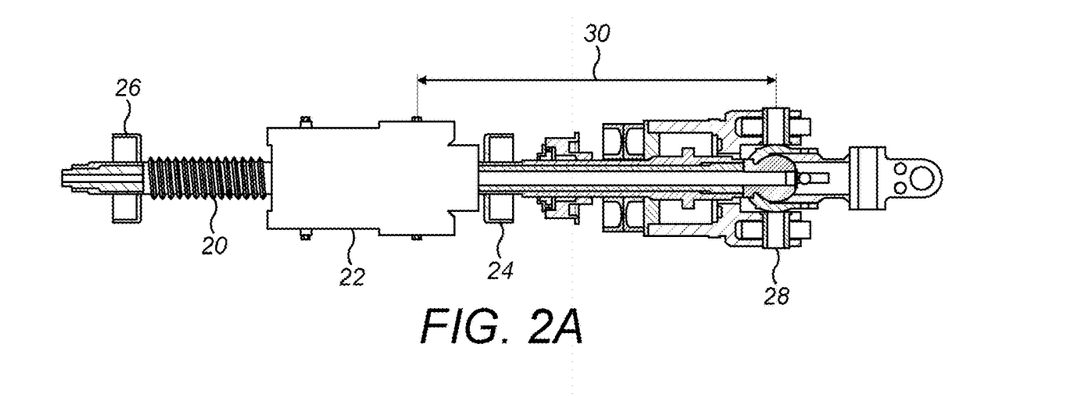
FIGS. 2A-2C show cross sections of the screw/nut arrangement of the actuator.
Figure 2B:
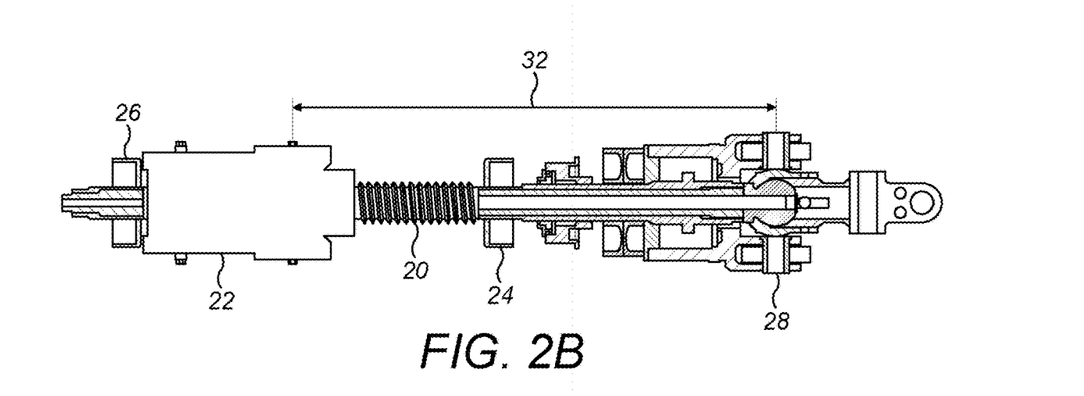
Figure 2C:
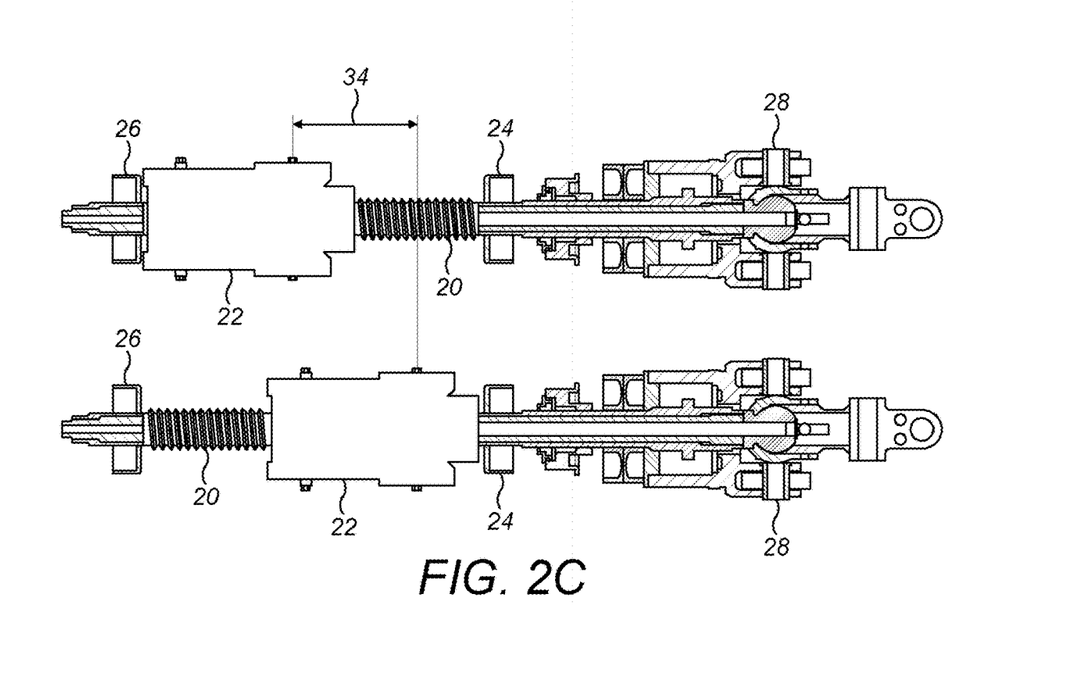

FIGS. 2A-2C show the mechanical screw arrangement of the actuator 10.

FIG. 2A shows the nut 22 in its maximum retracted position, i.e. as it is retracted against the upper stop 24, and a retracted distance 30 is defined between the nut 22 and its attachment 28 to the fuselage 12.

FIG. 2B shows the nut 22 in its maximum extended position, i.e. as it is retracted against the lower stop 26, and an extended distance 32 is defined between the nut 22 and its attachment 28 to the fuselage 12.

FIG. 2C illustrates a differential distance 34 that the nut 22 moves as it travels from its maximum retracted position to its maximum extended position.

The differential distance 34 may be known as the maximum stroke of the nut 22 and/or the actuator 10. The maximum stroke includes what is known as an "overstroke", which is a portion of the stroke just preceding the contact between the nut 22 and the upper stop 24 and/or lower stop 26. During normal operation, the nut 22 is not extended into the overstroke. Thus, the overstroke is present to avoid contact between the nut 22 and the upper stop 24 and/or lower stop 26.

The overstroke is calculated to take into account a given amount of free movement between the nut 22 and the screw 20. This free movement is otherwise known as backlash, or clearance, and is due to, for example, the free axial movement of the nut relative to the screw shaft. This might be caused in part by the movement of balls that may be present between the nut and the shaft of the screw (in the form of a ballscrew). Thus, the overstroke value is chosen such that during normal operation the nut 22 cannot contact the upper stop 24 and/or lower stop 26 due to this free movement.

Figure 3:
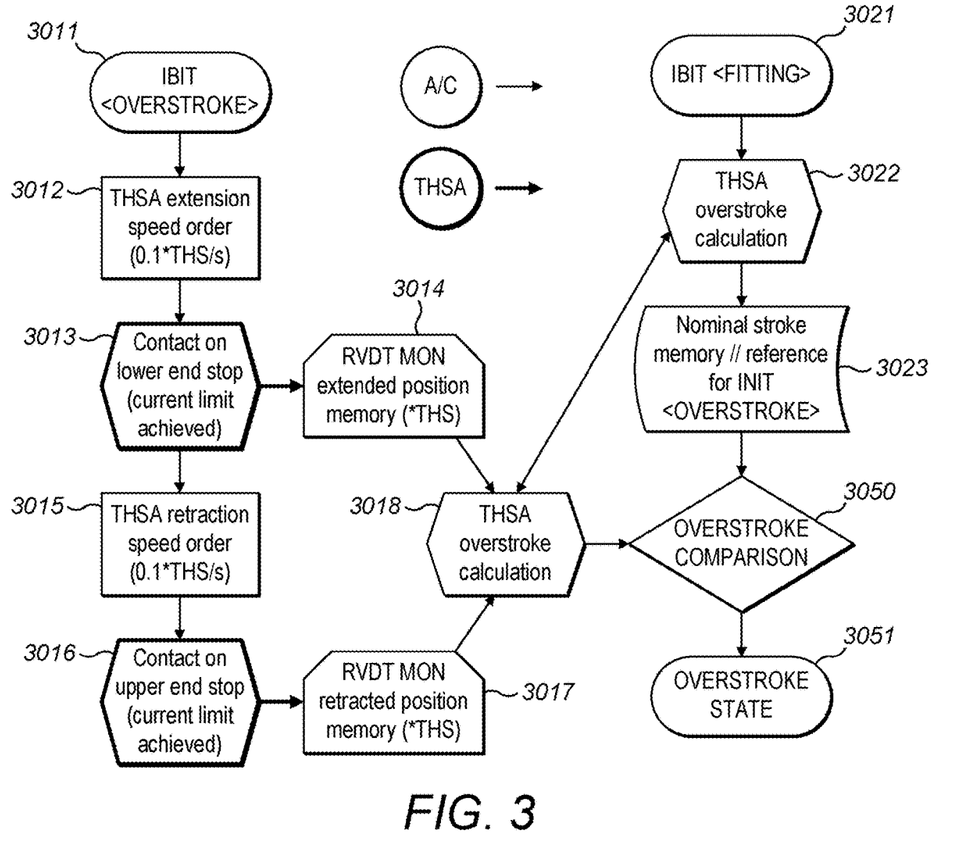
FIG. 3 shows a flow diagram of an overstroke check.

FIG. 3 shows a flow diagram corresponding to the steps an aircraft computer might take to check and verify the overstroke.

To calculate the overstroke at a given point in time ("test overstroke"), a first initiated built-in test ("IBIT") may be performed by the aircraft computer. A first step 3012 orders extension of the actuator 10 until the nut 22 contacts the lower stop 26 at 3013, and the position of the nut 22 in this maximum extended position is stored in memory 3014. The actuator 10 may then be retracted until the nut 22 contacts the upper stop 24 at 3015, and the position of the nut 22 in this maximum retracted position may be stored in memory 3017. An overstroke value is calculated at 3018 and output as the test overstroke.

A procedure 3021 may be carried out to provide a reference value for overstroke when an actuator 10 is fitted ("reference overstroke"). The reference overstroke may be calculated at 3022 using the same procedure as in steps 3012-3018. This reference overstroke may be stored in memory at 3023.

An overstroke comparison 3050 may be made between the reference overstroke and the test overstroke at a given point in time. This comparison outputs the difference between the reference overstroke and the test overstroke, and outputs state corresponding to the outcome of this comparison. For example, if this difference is lower than a given value then the outcome of the test may be positive, indicating that the current overstroke is within predefined limits.

If the difference is higher that a given value then the outcome may be negative, indicating that the nut 22 travel is shorter than previously. This may be due, for example, an increase in the free movement between the nut 22 and the screw 20 that causes the nut 22 to contact the upper stop 24 and/or lower stop 26 earlier in the stroke. In such a case, an inspection of the actuator may be required to check for wear.

Figure 4:
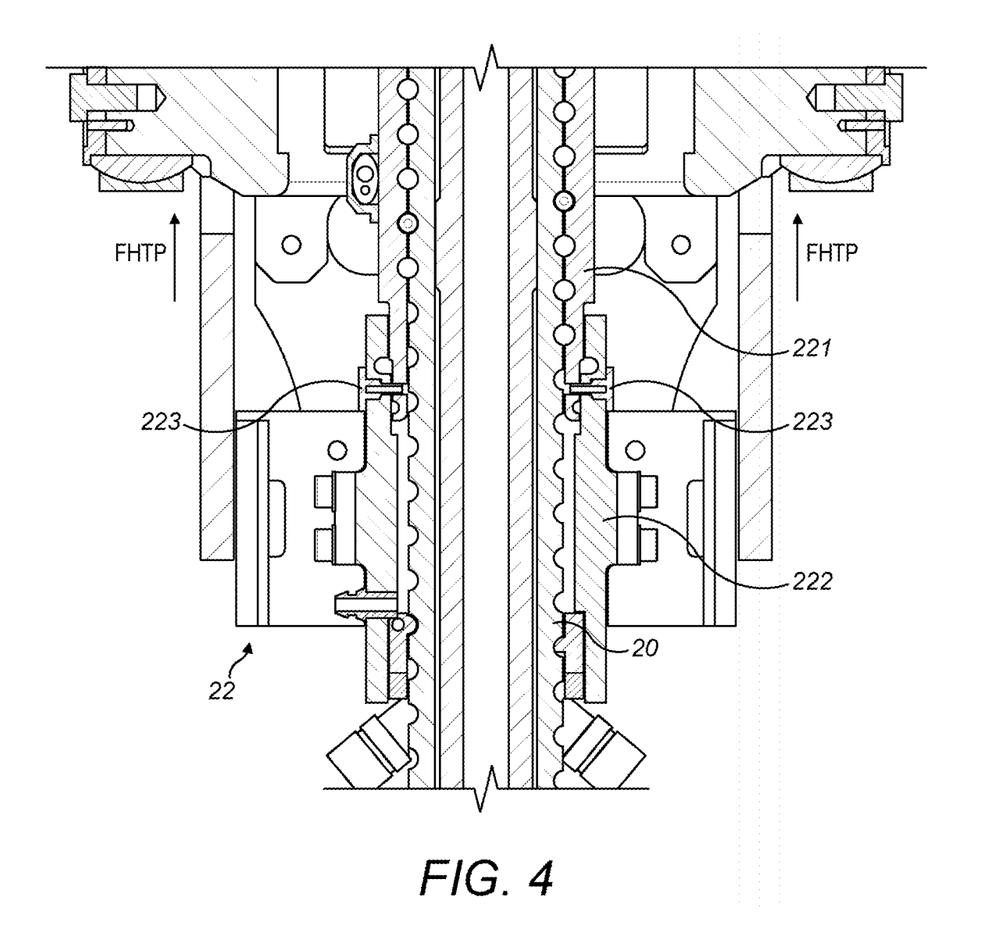
FIG. 4 shows the screw/nut arrangement of the actuator.

FIG. 4 shows in more detail the nut 22 of the present disclosure. The nut 22 comprises a primary nut body 221, which forms the main part of the nut 22. A secondary nut body 222 is provided to act as a failsafe and provide a force to the moveable component 14 in case the primary nut body 221 fails, for example due to failure of the thread between the nut 22 and the primary nut body 221. Fuse pins 223 are provided between the primary nut body 221 and the secondary nut body 222. It is important to be able to provide a measure of the wear of the screw assembly during use, and this is the aim of the present disclosure.

Figure 5A:
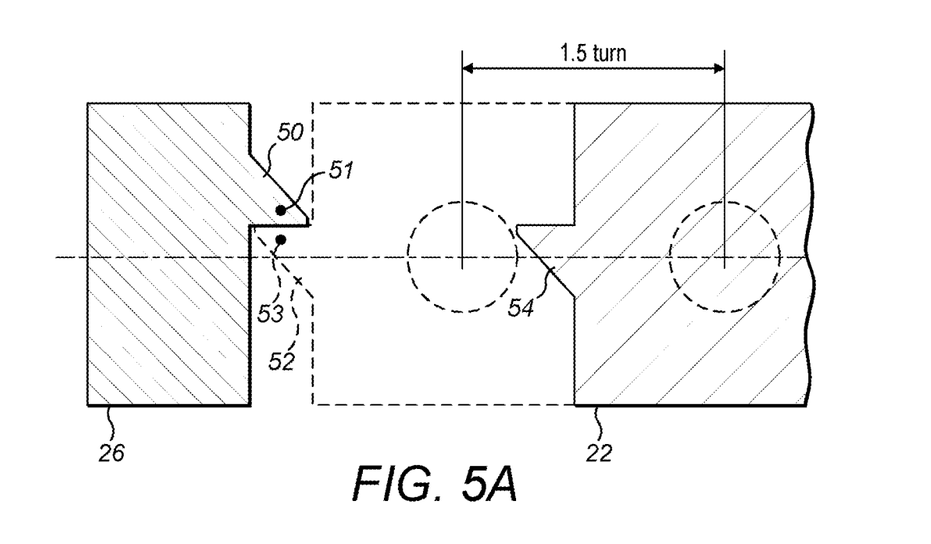
FIGS. 5A and 5B show the backlash between the nut and the screw of the actuator.

FIG. 5A shows a schematic of the lower end stop 26 and the nut 22. It will be appreciated that the upper end stop 24 may have the same features as described below for the lower end stop 26. The nut 22 is shown in solid line at the start of the overstroke, and in a dotted line at the end of the overstroke. The screw (not shown), and hence the lower end stop 26, rotates a given number of times, for example in the illustrated case 1.5 times, between the start of the overstroke and the end of the overstroke.

The lower end stop 26 comprises a lug 50 that provides the contact surface for the nut 22. The axial travel of the nut 22 corresponding to a full turn of the screw may be less than the height of the lug 50, ensuring that the lug 50 is optionally the only contact surface of the lower end stop 26 with the nut 22.

The nut 22 comprises a first lug 52 and a second lug 54. The first lug 52 comprises a mark 53 and is configured to contact the lug 50 of the lower end stop 26 to define the initial axial limit of the nut 22. The second lug 54 does not comprise a mark, or may be marked differently, such that the first lug 52 and the second lug 54 are visually differentiable from one another.

Figure 5B:
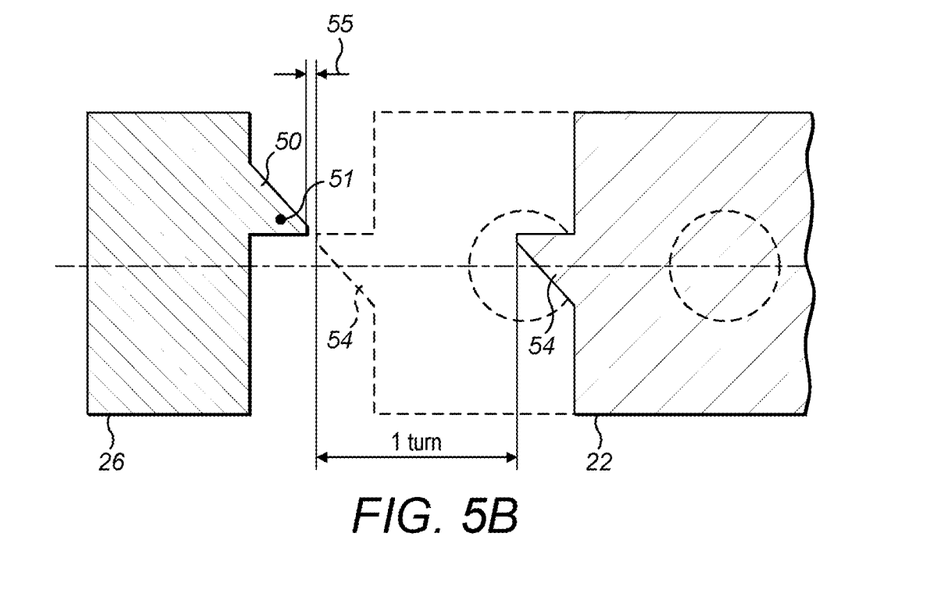

FIG. 5B shows a schematic of the lower end stop 26 and the nut 22 in the middle of the overstroke, that is after 1 turn from the start. The dimensions are exaggerated and the schematic is not to scale. At this point in the rotation of the screw and lower end stop 26 the second lug 54 is travelling past the lug 50 of the lower end stop 26 and will not contact it due to the axial clearance 55 between the lug 50 and the second lug 54. It is apparent that if this axial clearance 55 is reduced then the second lug 54 will contact the lug 50 on the lower end stop 26 instead of, and prior to the first lug 52.

Upon an increase in free movement, or backlash between the nut 22 and the screw the axial clearance 55 shown in FIG. 5B will decrease. Therefore, the axial clearance 55 may be configured such that it corresponds to an acceptable amount of free movement between the nut 22 and the screw. Once the free movement between the nut 22 and the screw falls below this acceptable amount, the second lug 54 will contact the lug 50 on the lower end stop 26 instead of, and prior to the first lug 52.

This means that instead of the mark 53 on the first lug 52 showing next to the mark 51 on the lug of the lower end stop 26, there will be no mark showing. This allows a very easy indication of the amount of free movement between the nut and the screw. For example, an inspector can run the screw assembly to the end of the overstroke, and check whether the marks are aligned, or not.

The axial clearance 55 may be adjustable by adjusting the rotational position of the nut 22, or by adjusting the rotational position of the lower end stop 26. For example, the lower end stop 26 could be fixed to the screw by means of splines, and the lower end stop 26 could be removed from the screw assembly, rotated, and then inserted back into the screw assembly at a different rotational position.

It is possible to vary the structure described above whilst achieving the result of providing an indication of the amount of free movement between the nut and the screw using features provided on the nut and the stop.

It will be appreciated that the first and second lugs could be provided on the stop, rather than the nut, and a cooperating lug could be provided on the nut.

Instead of providing two lugs on the nut, for example, a single lug having a grading could be provided. A corresponding or cooperating mark could be provided on the lug on the stop such that the amount of free movement is indicated by the point at which the mark stops on the grading.

A plurality of lugs could be provided on the nut and/or stop, wherein the amount of free movement between the nut and the screw could be indicated by which of the plurality of lugs contacts a cooperating lug on the other of the nut and/or stop.

It will be appreciated that further arrangements are contemplated that achieve the effect of indicating an amount of free movement between said nut and said screw using features provided on the nut and the stop, and although the present disclosure has been described with reference to the embodiments described above, it will be understood by those skilled in the art that various changes in form and detail may be made without departing from the scope of the accompanying claims.

The invention claimed is:

1. A screw assembly for an actuator, comprising:
   a screw;
   a nut threaded on said screw, such that rotation of said screw causes axial movement of said nut;
   a stop located at an end of said screw and defining an axial limit of said nut;
   a first feature located on said nut; and
   a second feature located on said stop;
   wherein said first and second features cooperate with one another upon contact of said nut with said stop so as to indicate an amount of backlash that exists between said nut and said screw during movement of said nut towards said stop;
   wherein said first and second features are positioned such that, upon contact of said nut with said stop, the relative positions of the first and second features is dependent on the amount of backlash to provide a measure of said backlash.

2. The screw assembly as claimed in claim 1, wherein said first feature comprises a first mark and said second feature comprises a second mark.

3. The screw assembly as claimed in claim 2, wherein, upon contact of said nut with said stop, said first and second features align with one another if the amount of backlash between said nut and said screw is within a predetermined limit, and do not align with one another if the amount of said backlash is outside of said predetermined limit.

4. The screw assembly as claimed in claim 1, wherein a rotational position of said second feature upon contact of said nut with said stop is adjustable by adjusting the rotational position of the stop with respect to the nut.

5. The screw assembly as claimed in claim 1, wherein one of said first feature and second feature comprises a first lug arranged to contact a cooperating lug of the other of said first feature and second feature to define an initial axial limit of said nut.

6. The screw assembly as claimed in claim 5, wherein said one of said first feature and second feature comprises a second lug configured to contact said cooperating lug of the other of said first feature and second feature.

7. The screw assembly as claimed in claim 6, wherein said contact between said second lug and said cooperating lug of the other of said first feature and second feature limits axial movement of said nut.

8. The screw assembly as claimed in claim 7, wherein said first and second lugs are located at different circumferential positions on said one of said nut and stop.

9. The screw assembly as claimed in claim 7, wherein said first and second lugs are located at different circumferential positions on said one of said nut and stop, and the rotational movement of at least one of said nut and said stop is limited such that a clearance is provided between said second lug and said cooperating lug on the other of said nut and stop in the final turn of said screw.

10. The screw assembly as claimed in claim 9, wherein said first lug contacts said cooperating lug on the other of said nut and stop if the amount of said backlash is within a clearance limit, and said second lug contacts said cooperating lug on the other of said nut and stop if the amount said backlash is outside of said clearance limit.

11. The screw assembly as claimed in claim 6, wherein said nut comprises said first and second lugs, and said first and second lugs include said first feature, and said cooperating lug on said stop includes said second feature.

12. The screw assembly as claimed in claim 6, wherein said stop comprises said first and second lugs, and said first and second lugs include said second feature, and said cooperating lug on said stop includes said first feature.

13. An actuator for an aircraft comprising a screw assembly as claimed in claim 1.

14. The screw assembly as claimed in claim 1, wherein said first feature comprises a first tactile feature and said second feature comprises a second tactile feature.

* * * * *